(12) United States Patent
Suntharalingam et al.

(10) Patent No.: US 9,174,741 B2
(45) Date of Patent: Nov. 3, 2015

(54) HYBRID POWERTRAIN SYSTEM

(71) Applicant: McMaster University, Hamilton (CA)

(72) Inventors: Piranavan Suntharalingam, Hamilton (CA); Ali Emadi, Burlington (CA)

(73) Assignee: McMaster University, Hamilton (CA)

( * ) Notice: Subject to any disclaimer, the term of this patent is extended or adjusted under 35 U.S.C. 154(b) by 18 days.

(21) Appl. No.: 13/937,310

(22) Filed: Jul. 9, 2013

(65) Prior Publication Data

US 2014/0010652 A1 Jan. 9, 2014

Related U.S. Application Data

(60) Provisional application No. 61/669,165, filed on Jul. 9, 2012.

(51) Int. Cl.
*B60W 10/08* (2006.01)
*B64D 35/08* (2006.01)
*B64D 27/02* (2006.01)

(52) U.S. Cl.
CPC .............. *B64D 35/08* (2013.01); *B64D 27/02* (2013.01); *B64D 2027/026* (2013.01); *Y02T 50/44* (2013.01); *Y02T 50/64* (2013.01)

(58) Field of Classification Search
CPC ................................ B64D 35/02; B64D 35/08
See application file for complete search history.

(56) References Cited

U.S. PATENT DOCUMENTS

| 6,565,037 | B1 | 5/2003 | Tonkovich | |
|---|---|---|---|---|
| 8,011,461 | B2 | 9/2011 | Rodriguez et al. | |
| 8,640,439 | B2 * | 2/2014 | Hoffjann et al. | 60/39.55 |
| 2008/0006739 | A1 * | 1/2008 | Mochida et al. | 244/60 |
| 2008/0184906 | A1 * | 8/2008 | Kejha | 102/374 |
| 2009/0072082 | A1 | 3/2009 | Arel | |
| 2009/0145995 | A1 | 6/2009 | Kreuzer et al. | |
| 2009/0145998 | A1 | 6/2009 | Salyer | |
| 2009/0293494 | A1 | 12/2009 | Hoffjann et al. | |
| 2010/0000807 | A1 | 1/2010 | Rodriguez et al. | |
| 2010/0038473 | A1 * | 2/2010 | Schneider et al. | 244/60 |
| 2010/0064689 | A1 * | 3/2010 | Reinhardt | 60/706 |
| 2010/0072318 | A1 * | 3/2010 | Westenberger | 244/54 |
| 2010/0126178 | A1 * | 5/2010 | Hyde et al. | 60/767 |
| 2011/0073717 | A1 | 3/2011 | Foucault et al. | |
| 2011/0108663 | A1 * | 5/2011 | Westenberger | 244/60 |
| 2012/0025032 | A1 * | 2/2012 | Hopdjanian et al. | 244/53 R |
| 2012/0209456 | A1 * | 8/2012 | Harmon et al. | 701/3 |
| 2013/0227950 | A1 * | 9/2013 | Anderson et al. | 60/718 |
| 2015/0008857 | A1 * | 1/2015 | Firanski et al. | 318/400.38 |

FOREIGN PATENT DOCUMENTS

| EP | 1209076 A3 | 5/2002 |
|---|---|---|
| WO | 9313979 A1 | 7/1993 |
| WO | 2006113877 A3 | 10/2006 |
| WO | 2010123601 A9 | 10/2010 |

* cited by examiner

*Primary Examiner* — Dirk Wright
(74) *Attorney, Agent, or Firm* — Bereskin & Parr LLP/S.E.N.C.R.L., s.r.l.

(57) ABSTRACT

A hybrid powertrain for an aircraft may include a drive shaft, the drive shaft, an internal combustion engine to selectably drive the drive shaft, a propeller coupled to the drive shaft and an electric motor having a stator and a rotor and operable to selectably drive the drive shaft. The drive shaft may extend through the electric motor. The rotor may be coupled to the drive shaft to rotate with the drive shaft and the rotor is a flywheel for the internal combustion engine.

27 Claims, 7 Drawing Sheets

HYBRID POWERTRAIN SYSTEM

CROSS REFERENCE TO RELATED APPLICATIONS

This application claims the benefit of 35 USC 119 based on the priority of U.S. Provisional Patent Application 61/669,165, filed Jul. 9, 2012, such application being incorporated herein in its entirety by reference.

FIELD

The present subject matter of the teachings described herein relates generally to a hybrid powertrain system. Specifically, the teachings described herein relate to a powertrain that includes an electric drive apparatus and a non-electric drive apparatus, such, for example, as a fossil fuel powered engine.

BACKGROUND

US 2009/0145998 discloses an air vehicle incorporating a hybrid propulsion system. The system includes a gas turbine engine as a first motive power source, and one or more battery packs as a second motive power source. Through selective coupling to a DC electric motor that can in turn be connected to a bladed rotor or other lift-producing device, the motive sources provide differing ways in which an aircraft can operate. In one example, the gas turbine engine can provide operation for a majority of the flight envelope of the aircraft, while the battery packs can provide operation during such times when gas turbine-based motive power is unavailable or particularly disadvantageous. In another example, both sources of motive power may be decoupled from the bladed rotor such that the vehicle can operate as an autogyro.

US 2010/0000807 discloses an electro-mechanical drive train for a hybrid electric vehicle. The electro-mechanical drive train includes a housing and a pinion shaft having a first end disposed within the housing and a second end in communication with a combustion engine. A differential is disposed within the housing and in combination with the end of the pinion shaft. An electric motor is also disposed within the housing and in actuating combination with the pinion shaft.

US 2009/0293494 discloses an electro-mechanical drive train for a hybrid electric vehicle. The electro-mechanical drive train includes a housing and a pinion shaft having a first end disposed within the housing and a second end in communication with a combustion engine. A differential is disposed within the housing and in combination with the end of the pinion shaft. An electric motor is also disposed within the housing and in actuating combination with the pinion shaft.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

According to one broad aspect of the teachings described herein, a hybrid powertrain for an aircraft may include a drive shaft. The drive shaft may be rotatable about a drive axis. The powertrain may also include an internal combustion engine to selectably drive the drive shaft and a propeller coupled to the drive shaft. The propeller may be rotatable about the drive axis. The powertrain may include an electric motor having a stator and a rotor. The electric motor may be operable to selectably drive the drive shaft. The drive shaft may extend through the electric motor. The rotor may be coupled to the drive shaft to rotate with the drive shaft and may be rotatable about the drive axis relative to the stator. The rotor may be a flywheel for the internal combustion engine.

The rotor may be between the internal combustion engine and the propeller.

The electric motor may be between the internal combustion engine and the propeller.

The internal combustion engine may include an output shaft that is coupled to the drive shaft.

The output shaft may be fixedly coupled to the drive shaft or may be detachably coupled to the drive shaft.

The powertrain may also include a clutch provided between the output shaft and the drive shaft, when the clutch is engaged the output shaft is coupled to the drive shaft and when the clutch is disengaged the output shaft is decoupled from the drive shaft and the drive shaft can rotate relative to the output shaft.

The electric motor may have sufficient power to independently drive the propeller when the clutch is disengaged and the internal combustion engine is not driving the drive shaft.

The output shaft may be coaxial with and rotates about the drive shaft.

The powertrain may also include a first gear mechanism coupled between the output shaft and the drive shaft so that the output shaft rotates at a first speed and the drive shaft rotates at a second speed that is different than the first speed.

The first gear mechanism may include a first planetary gear system having a first sun gear driven by the output shaft, a non-rotatable first outer ring gear and at least two first planet gears rotatably mounted on a first planet carrier and disposed radially between the first sun gear and the first outer ring gear. The first planet carrier may be non-rotatably coupled to the drive shaft.

The rotor may be rotatable relative to the drive shaft and may be coupled to the drive shaft via a second gear mechanism, so that the drive shaft rotates at the second speed and the rotor rotates at a third speed that is different than the second speed.

The second gear mechanism may include a second planetary gear system having a second sun gear coupled to the rotor, a non-rotatable second outer ring gear and at least two second planet gears rotatably mounted on a second planet carrier and disposed between the second sun gear and the second outer ring gear. The second planet carrier may be non-rotatably coupled to the drive shaft.

The powertrain may also include a third gear mechanism connecting the propeller to the drive shaft, so that the drive shaft rotates at the second speed and the propeller rotates at a fourth speed that is different than the second speed The third gear mechanism may include a third planetary gear system having a third sun gear driven by the drive shaft, a non-rotatable third outer ring gear and at least two third planet gears rotatably mounted on a third planet carrier and disposed between the third sun gear and the third outer ring gear. The third planet carrier may be non-rotatably coupled to the propeller.

The rotor may be fixedly and non-rotatably connected to the drive shaft and rotates in unison with the drive shaft.

The internal combustion engine and the electric motor may be disposed within a powertrain housing.

The stator has a stator length in a first direction and the space between the internal combustion engine and the electric motor in the first direction may be between about 5% and about 200% of the stator length.

The electric motor may be a starter motor for the internal combustion engine.

The rotor may be the only flywheel in the powertrain.

The powertrain may be operable to drive the propeller at least a takeoff power output when the aircraft is taking off and a cruising power output when the aircraft is cruising, and a maximum power output of the internal combustion engine is less than the takeoff power output.

The maximum power output of the internal combustion engine may be equal to or greater than the cruising power output.

A maximum power output of the electric motor may be less than the takeoff power output.

The maximum power output of the electric motor may be equal to or greater than the cruising power output.

The internal combustion engine and the electric motor are operable to simultaneously drive the drive shaft.

The electric motor may be configurable in an energized state in which it drives the drive shaft and a non-energized state in which it does not drive the drive shaft, and the rotor rotates with the drive shaft and relative to the stator when the electric motor is in either the energized state or the non-energized state.

The powertrain may be selectably operable in a first configuration in which both the internal combustion engine and the electric motor cooperate to drive the drive shaft, a second configuration in which only the internal combustion engine drives the drive shaft and a third configuration in which only the electric motor drives the drive shaft.

According to another broad aspect of the teachings described herein, a method of operating a hybrid power train in an aircraft may include the steps of:

a) driving a propeller with both an internal combustion engine and an electric motor during an aircraft takeoff phase;

b) transitioning from the takeoff phase to an aircraft cruising phase and driving the propeller with only one of the internal combustion engine and the electric motor during at least a portion of the cruising phase.

step b) comprises driving the propeller using only the internal combustion engine during the at least a portion of the cruising phase.

The internal combustion engine may drive a drive shaft connected to the propeller and the electric motor may include a rotor coupled to and rotatable with the drive shaft. The method may also include driving the rotor of the electric motor with the internal combustion engine during the cruising phase so that the rotor is a flywheel for the internal combustion engine.

Step b) may include driving the propeller using only the electric motor during the at least a portion of the cruising phase.

The method may also include decoupling the internal combustion engine from the electric motor during the at least a portion of the cruising phase so that the internal combustion engine is not driven by the electric motor.

The method may also include re-starting the internal combustion engine using the electric motor during the cruising phase.

The method may also include starting the internal combustion engine using the electric motor prior to the takeoff phase.

The method may also include reducing the amount of heat generated by the power train by driving the propeller using only the electric motor during the at least a portion of the cruising phase.

The propeller may be coupled to a drive shaft and the electric motor comprises a rotor coupled to the drive shaft and may be selectably configurable between an energized state in which a rotor drives the drive shaft, and a non-energized state in which the drive shaft drives the rotor.

The propeller may be coupled to a drive shaft and the electric motor comprises a rotor coupled to the drive shaft and further comprising driving the propeller at a different rotational speed than the rotor by coupling at least one of the propeller and the rotor to the drive shaft with a gear mechanism.

DRAWINGS

The drawings included herewith are for illustrating various examples of articles, methods, and apparatuses of the teaching of the present specification and are not intended to limit the scope of what is taught in any way.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

The teachings disclosed herein relate generally to a hybrid powertrain for powering a vehicle. The powertrain includes two drive apparatuses that can be used in combination or independently to drive a drive shaft. Preferably the drive apparatuses are different from each other, and more preferably the drive apparatuses include an electric drive apparatus and a non-electric drive apparatus, such, for example, as a fossil fuel powered engine The two drive apparatuses may be configured so that they can be used in combination to power a drive shaft, and so that one of the drive apparatuses can be turned off and the drive shaft can continue to be driven by the other one of the drive apparatuses. This configuration may allow the powertrain to be operated in a variety of operating modes. For example, the powertrain may be operable i) with a first drive apparatus powering the drive shaft and a second drive apparatus off; ii) with the first drive apparatus off and the second drive apparatus powering the drive shaft; and iii) with both the first and second drive apparatuses powering the drive shaft. This may also allow the total power output of the powertrain to be modified based on which of the drive apparatuses are in use.

The drive shaft can be connected to any suitable apparatus that can be used to help propel the vehicle, including, for example, a propeller, a transmission, wheels, tracks and any other propulsion mechanism. The term propeller can be understood to include airplane propellers of different configurations, as well as including ducted fans, rotors (such as helicopter rotors) and other such propulsion mechanisms.

Figure 1:
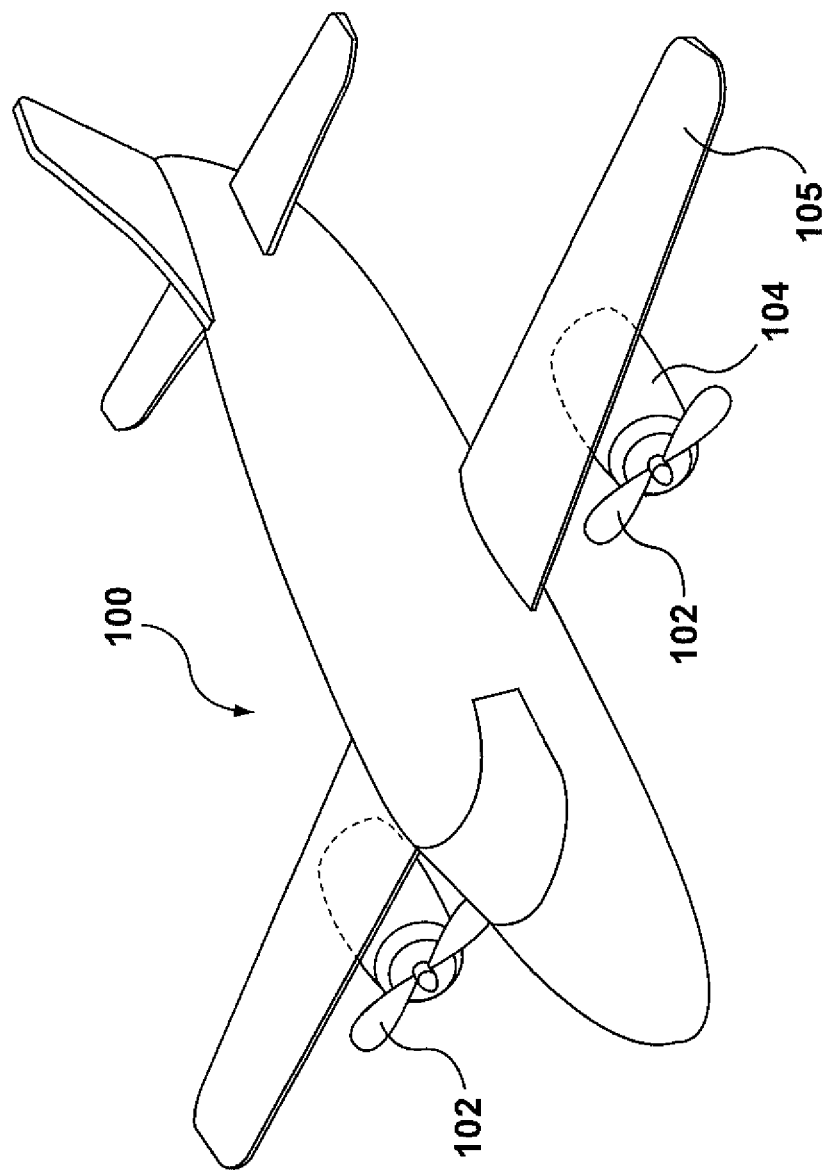
FIG. 1 is a perspective view of an aircraft having a hybrid powertrain.

Referring to FIG. 1, an illustrative example of an airplane 100 includes a propulsion system that includes a pair of propellers 102. Each propeller 102 is coupled to a respective drive unit 104 which, in the illustrated example, is attached to the underside of the wing 105 of the airplane. Alternatively, the airplane 100 may include only one propeller 102 or more than two propellers 102 with associated drive units 104. The drive units 104 may be identical to each other, or may have different configurations.

Figure 2:
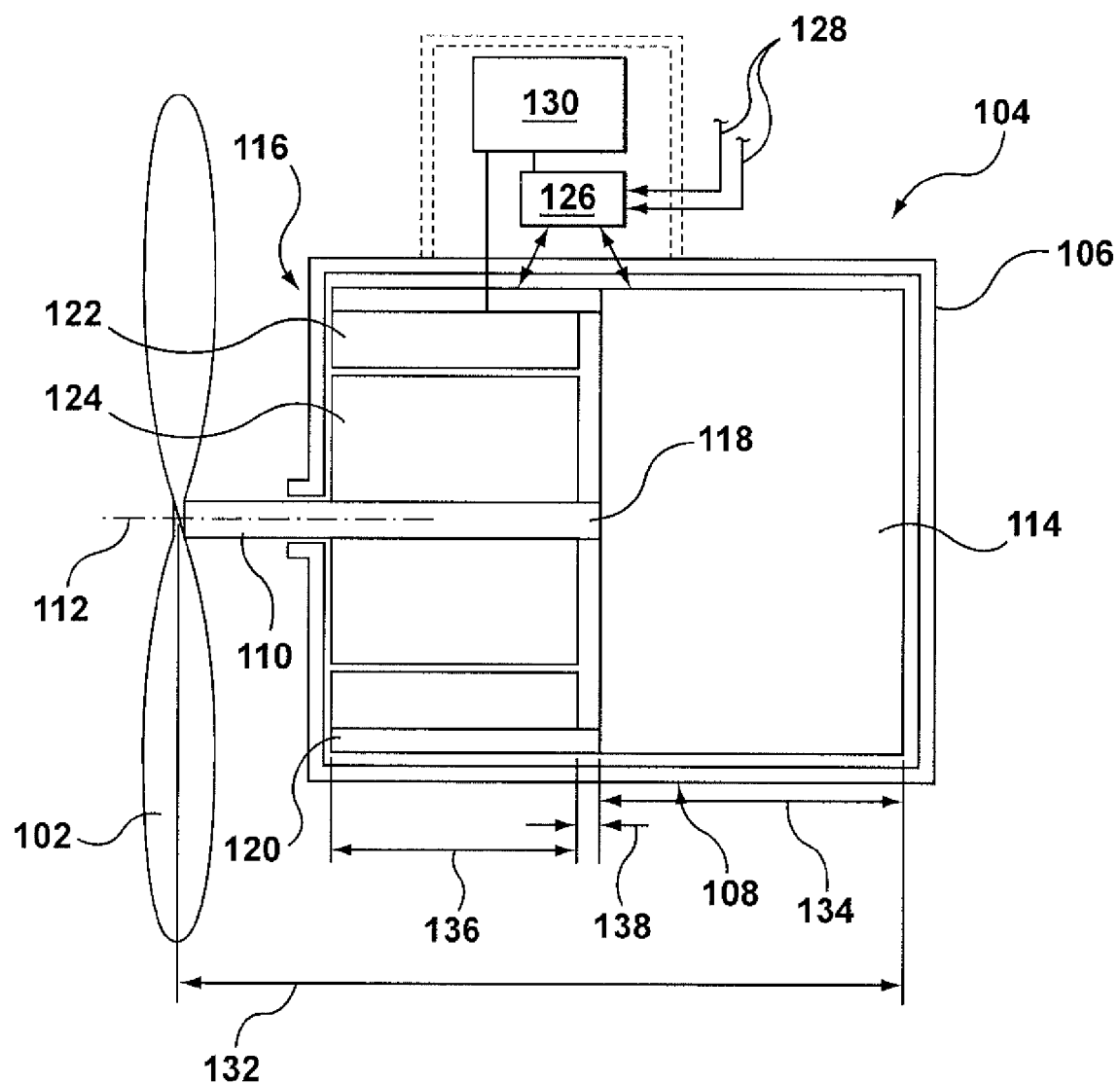
FIG. 2 is a schematic representation of an example of a hybrid powertrain.

Referring to FIG. 2, one example of drive unit 104 is illustrated schematically. In the illustrated embodiment, the drive unit 104 includes a housing 106 and a hybrid powertrain 108 that is contained within the housing 106. The hybrid powertrain 108 includes a drive shaft 110 that is rotatable about a drive axis 112. The hybrid powertrain 108 also includes an internal combustion engine 114 and an electric motor 116. The propeller 102 is coupled to the distal end of the drive shaft 110 so that it can be driven by one or both of the internal combustion engine 114 and the electric motor 116.

The internal combustion engine 114 may be any type of internal combustion engine that is suitable for use in an aircraft 100 (or another type of vehicle in another embodiment), including, for example, as two or four stroke piston engines (inline or V-configurations), rotary engines (e.g. a Wankel engine-type engine), a rotary piston engine, diesel engines and any other type of internal combustion engine. For illustrative purposes, the internal combustion engine is only illustrated schematically, and includes an output shaft 118 that rotates and is driven by the internal combustion engine 114. Fuel for the internal combustion engine 114 can be stored in any suitable fuel tank and can be delivered using any suitable fuel line or fuel delivery system.

The electric motor 116 may be any type of electric motor that is suitable for use in the aircraft 100 (or other vehicle) including, for example, a brushed DC motor (such as an electrically excited DC motor or a permanent magnet DC motor), a brushless DC motor, a switched reluctance motor, an induction motor, an AC motor, a synchronous motor or any other type of electric motor.

In the illustrated example, the electric motor 116 includes a housing 120, a stator 122 fixed within the housing 120 and a rotor 124 that is rotatable relative to the stator 122. The stator 122 and rotor 124 may be configured with any suitable number of poles, windings, etc. as required for a particular embodiment of the drive unit 104. In the embodiment illustrated, the rotor 124 is non-rotatably coupled to the drive shaft 110 so that the rotor 124 rotates with the drive shaft 110 and rotates about axis 112.

Optionally, both the internal combustion engine 114 and the electric motor 116 are operable to selectably drive the drive shaft, and propeller coupled thereto, to provide propulsive force for the aircraft. In the illustrated example, the drive shaft 110 is integrally connected with the output shaft 118 of the internal combustion engine 114. When the internal combustion engine 114 is on or energized (i.e. when it is operating to drive the output shaft 118) the propeller 102 is driven by the internal combustion engine 114. Further, the stator 122 is fixedly coupled to the drive shaft 110 so that they rotate together. In this configuration, when the electric motor 116 is on or energized (i.e. when power is supplied to the electro motor 116 to drive the rotor 124) the electric motor 116 can drive the drive shaft 110 and the propeller 102 to propel the aircraft.

In the illustrated configuration, the internal combustion engine 114 and the electric motor 116 may be operated in unison to drive the propeller 102. When operated in unison, the power provided to the propeller 102 may be the combination of the power produced by the internal combustion engine 114 and the power produced by the electric motor 116. Alternatively, or in addition to being operated in unison, the powertrain 108 may be operated with only one of the internal combustion engine 114 and the electric motor 116 in its on or energized state.

For example, while the powertrain 108 is in use the electric motor 116 may be turned off or de-energized such that it does not exert a driving force on the drive shaft 110. In this configuration, the drive shaft 110 and propeller 102 may be driven by only the internal combustion engine 114, and the total amount of power delivered by the powertrain 108 will be less than the total power delivered when both the internal combustion engine 114 and the electric motor 116 are energized.

In general, the takeoff propulsive power demand of the aircraft 100 is higher than the cruising power demand. That is, during the takeoff phase of operation, the airplane 100 may require the propeller 102 be driven with at a takeoff power level, whereas after the aircraft 100 has transitioned into the cruising phase of the flight the propeller 102 may be safely driven at a lower, cruising power level. Preferably, the powertrain 108 may be operable to drive the propeller 102 a takeoff power level when the aircraft 100 is taking off and a cruising power level when the aircraft 100 is cruising.

Optionally, both the internal combustion engine 114 and the electric motor 116 can be used co-operatively to provide sufficient power for takeoff. This may allow the powertrain 108 to provide the required takeoff power level while the maximum power output of each of the internal combustion engine 114 and the electric motor 116 individually is less than the takeoff power level. For example, the maximum power output of each of the internal combustion engine 114 and electric motor 116 may be less than the takeoff power output. For example, for a small aircraft the peak or takeoff power requirements may be around 80 kW while the continuous or cruising power requirements may be about 50 kW. The specific power requirements, and the ratio between cruising and takeoff power requirements may vary depending upon the aircraft design parameters and performance requirements.

However, the maximum power output level of one of the internal combustion engine 114 and the electric motor 116 may be selected so that it is greater than the cruising power requirements of the aircraft 100. For example, the cruising power requirements may be between about 45% and about 65% or more of the takeoff power requirements, and may be around 50% of the takeoff power levels. The power output ratio for a given flight may be a function of a variety of factors, including, for example, takeoff angle and head wind, etc. In this configuration, once the aircraft 100 reaches the cruising phase of the trip one of the internal combustion engine 114 and the electric motor 116 can be turned off, while the other of the internal combustion engine 114 and the electric motor 116 provides sufficient cruising power.

Optionally, both of the internal combustion engine 114 and the electric motor 116 may be selected so that they each can provide sufficient cruising power for the aircraft 100. In this configuration, either of the internal combustion engine 114 and the electric motor 116 may be turned off during cruising while the propeller is driven by the other of the internal combustion engine 114 and the electric motor 116. For example, the maximum power output of the internal combustion engine 114 may be equal to or greater than the cruising power level required by the aircraft 100, and/or the maximum power output of the electric motor 116 may be equal to or greater than the cruising power level. The internal combustion engine 114 and the electric motor 116 may be configured to have the same maximum power output, or different maximum power outputs.

Using this configuration, for a given aircraft 100, the internal combustion engine 114 in the powertrain 108 may be smaller and less powerful than an internal combustion engine that would be required to independently provide the full, takeoff power output. Using a smaller engine may help reduce the weight and size of the powertrain 108. Also, using a smaller internal combustion engine in the powertrain 108 may also allow other related or ancillary components to be smaller and/or lighter, which may further help reduce the weight of the aircraft 100. For example, a smaller internal combustion engine may require a smaller fuel tank, less robust mounting hardware, downsized cooling systems, downsized exhaust systems and other related components. Similarly, the electric motor 116 in the powertrain 108 may be smaller than a comparable electric motor that would be required to supply the full takeoff power level. Using a smaller electric motor 116 may reduce the size and weight of the motor, as well as related components like batteries and other power transmission equipment.

In the illustrated embodiment, the electric motor 116, and specifically the rotor 124, is positioned axially between the internal combustion engine 114 and the propeller 102 and the drive shaft 110 extends through the electric motor 116. In this configuration, the rotor 124 rotates with the drive shaft 110 and can be driven by the internal combustion engine 114 so that is will continue to rotate with the drive shaft 110 even when the electric motor 116 is de-energized. In this configuration, the rotating mass of the rotor 124 may help mitigate vibrations and/or torque ripple effects produced by the internal combustion engine 114. In this example the rotor 124 is the flywheel for the internal combustion engine 114. Configuring the powertrain 108 so that the rotor 124 of the electric motor 116 is driven by and is the flywheel for the internal combustion engine 114 may help eliminate the need for a separate flywheel to be provided with the internal combustion engine 114 assembly (as is commonly provided on internal combustion engines in aerospace applications).

Optionally, the mass of the rotor 124 may be selected such that the rotor 124 is the only flywheel that is required in the powertrain 108. Alternatively, in some applications a traditional flywheel component may still be desired or required, but its size and/or mass may be reduced as compared to a conventional powertrain due to the use of the rotor 124 as a flywheel. Configuring the powertrain 108 such that the rotor 124 is the only flywheel in the powertrain may help reduce the overall mass of the powertrain system 108 and/or may help reduce the overall size of the powertrain 108. Reducing the size of the powertrain 108 may allow for a more compact, space efficient configuration which may increase the available space for other components on the vehicle, and/or may allow the powertrain 108 to be used on smaller vehicles.

Similarly, utilizing the rotor 124 as a flywheel within the powertrain 108 may allow the mass of the propellers 102 to be reduced, as compared to a comparable, conventional powertrain system that relies on higher moment of inertia (heavier) propeller system, where the propeller system acts as a flywheel to eliminate the engine torque ripple. This may help facilitate the use of lighter construction materials for the propeller system, which may help decrease overall weight and in turn help increase the power density of the powertrain 108 when compared with a conventional single power source powertrain.

In addition to, or as an alternative to operating the powertrain 108 using only the internal combustion engine 114, the internal combustion engine 114 may be turned off while the aircraft 100 is in use and the propeller 102 may be driven only using the electric motor 116.

When in use, the internal combustion engine 114 may generate relatively high levels of noise and heat. For example, relatively large amount of the fuel energy (e.g. between 60-70%) provided to the internal combustion engine 114 may be dissipated as heat or thermal energy. Operating the powertrain 108 using only the electric motor 116 allows the internal combustion engine 114 to be turned off while still allowing the aircraft 110 to be operated. Turning off the internal combustion engine 114 may reduce the noise output of the aircraft 100. This may help reduce the observability or detectability of the aircraft 100. Such reduced noise output levels may be advantageous if detection of the aircraft 100 is to be avoided, such as during surveillance or military activities. Reduced noise output from the powertrain 108 may also help reduce the overall noise levels around airports and other installations. Turning off the internal combustion engine 114 may reduce the heat generated (i.e. the thermal output) of the aircraft 100, and specifically from the powertrain 108. Reducing the heat output of the powertrain 108 may also help reduce the observability or detectability of the aircraft 100 via thermal detection means by reducing the thermal signature of the powertrain 108.

Optionally, the state(s) of the internal combustion engine 114 and the electric motor 116 can be manually controlled by an operator who selectively turns the internal combustion engine 114 and the electric motor 116 on and off as desired. Alternatively, a controller 126 may be provided to automatically control the operation of the internal combustion engine 114 and the electric motor 116, based on one or more suitable input signals 128. For example, the controller 126 may be configured to automatically engage both the internal combustion engine 114 and the electric motor 116 when an operator increases the throttle position for the aircraft or configures the flaps and control surfaces into a takeoff position. The controller 126 may also be operable to automatically turn off one of the internal combustion engine 114 and the electric motor 116 when the throttle position is reduced and/or when the aircraft enters a cruising configuration. The input signals 128 may reflect any suitable information taken from one or more suitable sensors monitoring the condition of the aircraft 100, including, for example, airspeed, throttle position, flap position, altitude, operating mode (normal vs. low detection) and other suitable operating features.

In the illustrated configuration, the internal combustion engine 114 and the electric motor 116 are contained within a single housing 106. Optionally, as illustrated using dashed lines, other components may also be provided within the housing 106, such as controller 126 and a battery 130 for supplying power to the electric motor 116. Providing the internal combustion engine 114 and the electric motor 116 in close proximity to each other and within the same housing 106 may help reduce the overall size of the powertrain 108. It may also help facilitate mounting of the powertrain 108 within a vehicle. Alternatively, the internal combustion engine 114 and the electric motor 116 may be provided in separate housings.

In the illustrated embodiment, the internal combustion engine 114 and the electric motor 116 are positioned generally close together in the axial direction. This may help reduce the overall size of the powertrain 108. Referring to FIG. 2, in the illustrated embodiment the powertrain 108 has an overall length 132 in the axial direction, the internal combustion engine 114 has length 134 and the electric motor 116 has a length 136. In the illustrated embodiment the length 136 also corresponds to the length of the stator 122. Optionally, the lengths 134 and 136 may each be between about 10% and about 50% of the overall length 132.

In the illustrated configuration, the stator 122 is axially spaced apart from the internal combustion engine 114 by an offset distance 138. Optionally, the offset distance 138 may be between about 10% and about 200% of the stator length 136. Preferably, the offset distance may be less than about 100% of the stator length 136 and may be between about 40% and about 65% of the stator length 138.

Optionally, the internal combustion engine 114 and the electric motor 116 can be selected to have speed-torque characteristics that are suitable for driving the propeller 102 in a given embodiment, and that are compatible with each other so that the propeller 102 can be driven without the need for a transmission mechanism or other such devices. Alternatively, a transmission, clutch, gear mechanism or other suitable apparatus may be provided to allow the internal combustion engine 114 and the electric motor 116 to have different speed-torque characteristics.

When operating with only the electric motor 116 energized, the total power provided to the propeller 102 is limited to the output power of the electric motor 116. Further, if the drive shaft 110 remains fixedly connected to the internal combustion engine 114 the braking power of the internal combustion engine 114 is an additional burden on the electric motor 116, which may reduce the power available to drive the propeller 102. Optionally, the drive shaft 110 may be detachably or releasably coupled to the output shaft 118 so that the drive shaft 110 can be decoupled from the output shaft 118. Decoupling the drive shaft 110 from the output shaft 118 may allow the electric motor 116 to be used to drive the propeller 102 without having to overcome the braking force of the internal combustion engine 114. Reducing the load on the electric motor 116 when the internal combustion engine 114 is off may help improve the efficiency of the powertrain 108 (as opposed to having to also overcome the brake force). This configuration may also allow the electric motor 116 sized to drive the propeller to be smaller than an electric motor that was required to drive the propeller and overcome the brake force.

Optionally, the electric motor 116 may be a starter motor for the internal combustion engine 114. In this configuration, energizing the electric motor 116 to drive the drive shaft 110 can also provide starting motion/torque to the internal combustion engine 114 if the drive shaft 110 is coupled to the output shaft 118. Optionally, the electric motor 116 can be used to initially start the internal combustion engine 114 while the aircraft is on the ground, prior to the takeoff phase. Alternatively, or in addition, the electric motor 116 can be used to re-start the internal combustion engine 114 during the cruising phase (or any other phase) if the internal combustion engine 114 is turned off at some point during the cruising phase. This may eliminate the need for a separate starter motor for the internal combustion engine, which may help reduce the size and/or weight/and or complexity of the powertrain 108.

Figure 3:
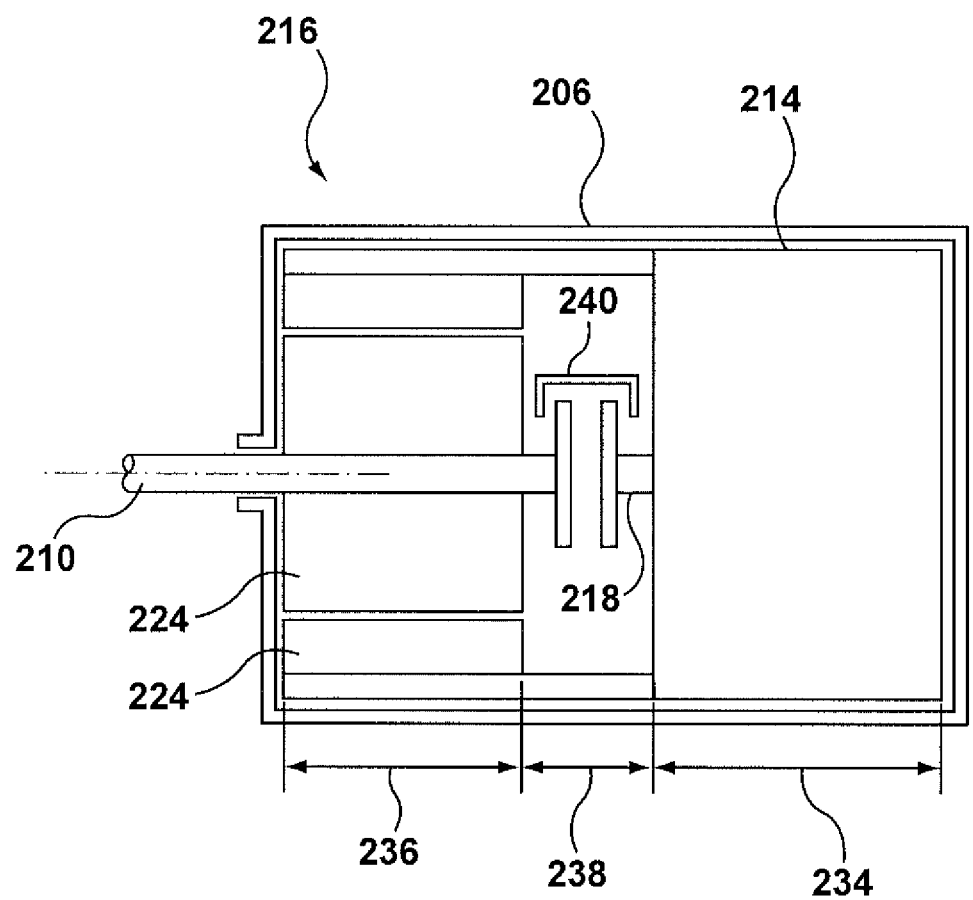
FIG. 3 is a schematic representation of another example of a hybrid powertrain.

Referring to FIG. 3, another embodiment of a powertrain 208 is illustrated schematically. The powertrain 208 is generally similar to powertrain 108, and like features are identified using like reference characters indexed by 100.

In the illustrated example, the powertrain 208 includes a detachable connection between the output shaft 218 and the drive shaft 210. Providing a detachable connection allows the internal combustion engine 214 to be decoupled from the drive shaft 210. For example, if the powertrain 208 is operating in electric only mode, in which the electric motor 216 drives the drive shaft 210, decoupling the internal combustion engine 214 from the drive shaft 210 may reduce the load/resistance faced by the electric motor 216. In the illustrate embodiment, the detachable connection includes a clutch 240 that connects the drive shaft 210 to the output shaft 218.

Figure 4:
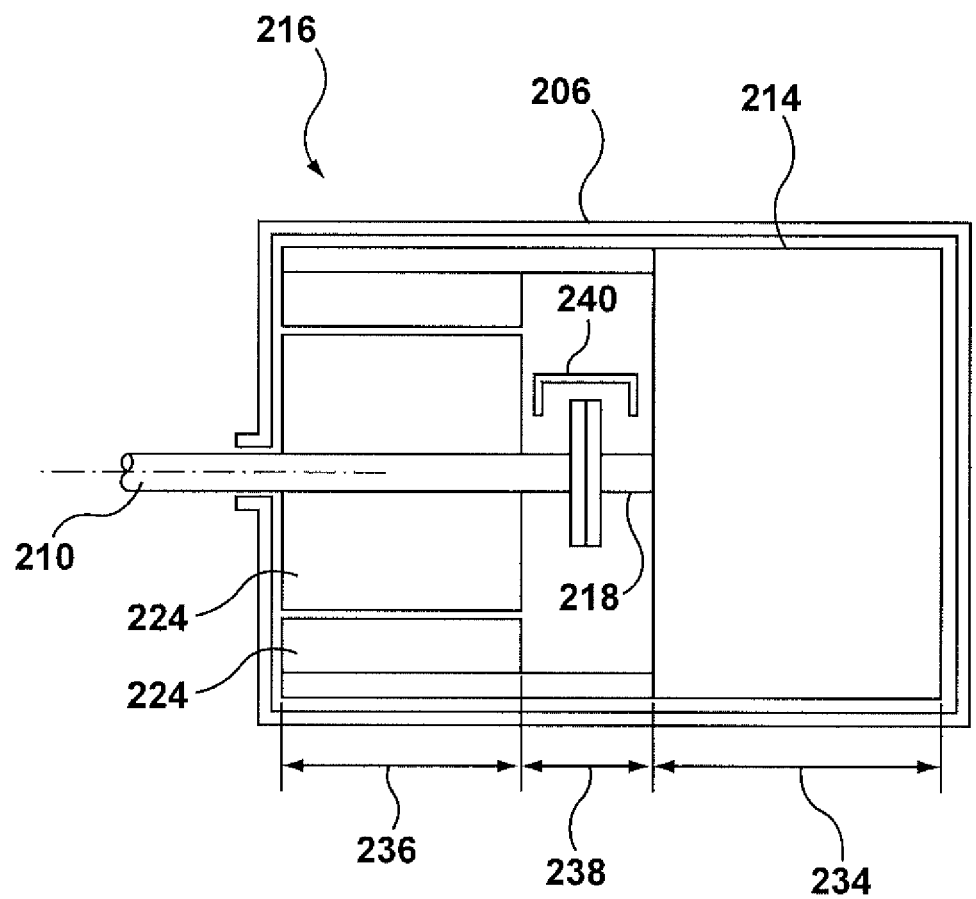
FIG. 4 is the hybrid powertrain of FIG. 3 with a clutch in an engaged position.

Preferably, the clutch 240 can be selectively engaged or disengaged, either automatically by a controller or manually by an operator, based on the operating condition of the powertrain 208. In the illustrated embodiment, the clutch 240 can be selectively engaged (FIG. 4) or disengaged (FIG. 3) to couple or decouple the internal combustion engine 214 form the drive shaft 210. When the clutch 240 is engaged (FIG. 4) the output shaft 218 is coupled to the drive shaft 210 and rotates in unison with the drive shaft 210. When the clutch 240 is disengaged (FIG. 3) the output shaft 218 is decoupled from the drive shaft 210 and the drive shaft 210 can rotate relative to the output shaft 218.

Optionally, as explained in more detail above, the electric motor 216 may have sufficient power to independently drive the associated propeller when the clutch 240 is disengaged and the internal combustion engine 214 is not driving the drive shaft 210.

In the illustrated example the output shaft 218 is coaxial with drive shaft 210. In this configuration the powertrain 208 can be configured in a generally linear configuration. Alternatively, the output shaft 218 need not be coaxial with the drive shaft 210. For example, the output shaft 218 may be offset from, and/or at an angle to, the drive shaft 210 and may be coupled to the drive shaft 210 using any suitable linkage mechanism, including, for example, gears, chain drives, drive belts or other suitable mechanisms.

Figure 5:
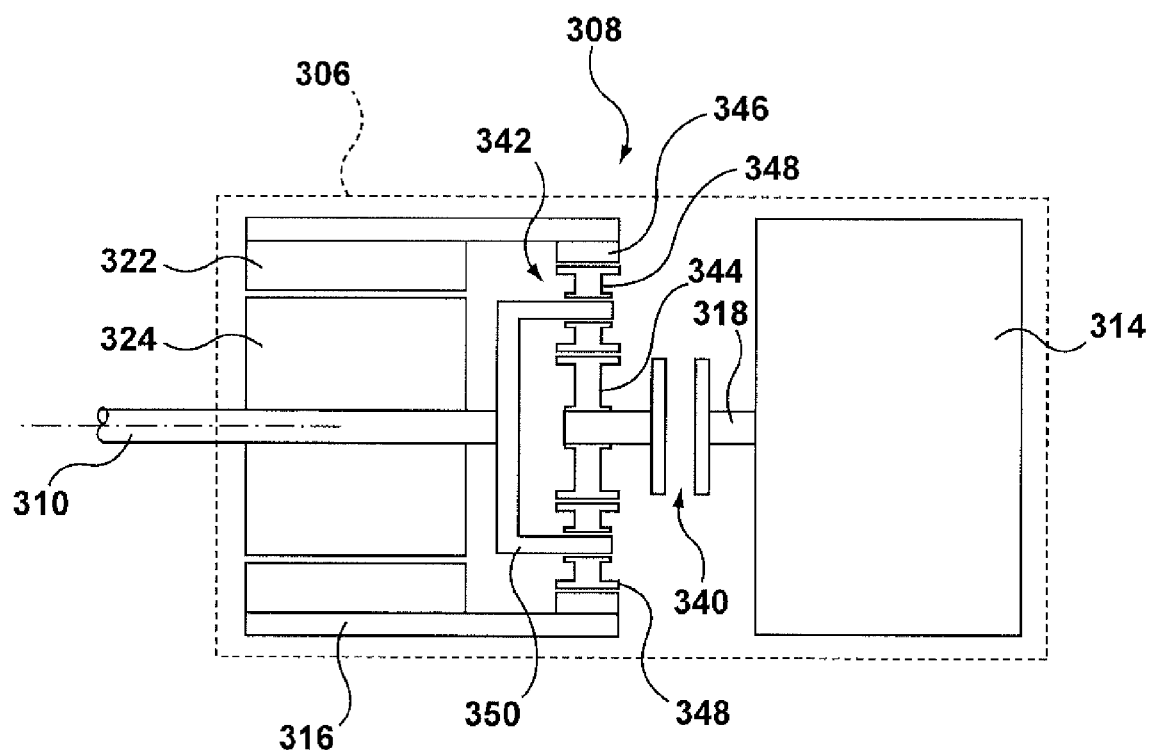
FIG. 5 is a schematic representation of another example of a hybrid powertrain.

Referring to FIG. 5, another embodiment of a powertrain 308 is illustrated schematically. The powertrain 308 is generally similar to powertrain 108, and like features are identified using like reference characters indexed by 200.

In this embodiment, the powertrain 308 includes a gear mechanism 342 coupled between the output shaft 318, via clutch 340, and the drive shaft 310 so that the output shaft 318 can rotate at a different speed, and optionally with a different torque than the drive shaft 310. The gear mechanism 342 may be any suitable mechanism, and in the illustrated embodiment is a planetary gear system 342.

The planetary gear system 342 has a sun gear 344 driven by the output shaft 318, a non-rotatable outer ring gear 346 (which may be fixed to the electric motor 316, the optional housing 306 or any other suitable member) and at least two planet gears 348 rotatably mounted on a planet carrier 350 and disposed radially between the sun gear 344 and the outer ring gear 346. In the illustrated example, the planet carrier 350 is non-rotatably coupled to the drive shaft 310, and may optionally be integrally formed with the drive shaft 310.

The gear ratio(s) between the sun gear 344, outer ring gear 346 and the planet gears 348 may be selected based on the speed-torque properties of the internal combustion engine 314 and the electric motor 316 and the desired operating speed of the propeller or other driven member.

Figure 6:
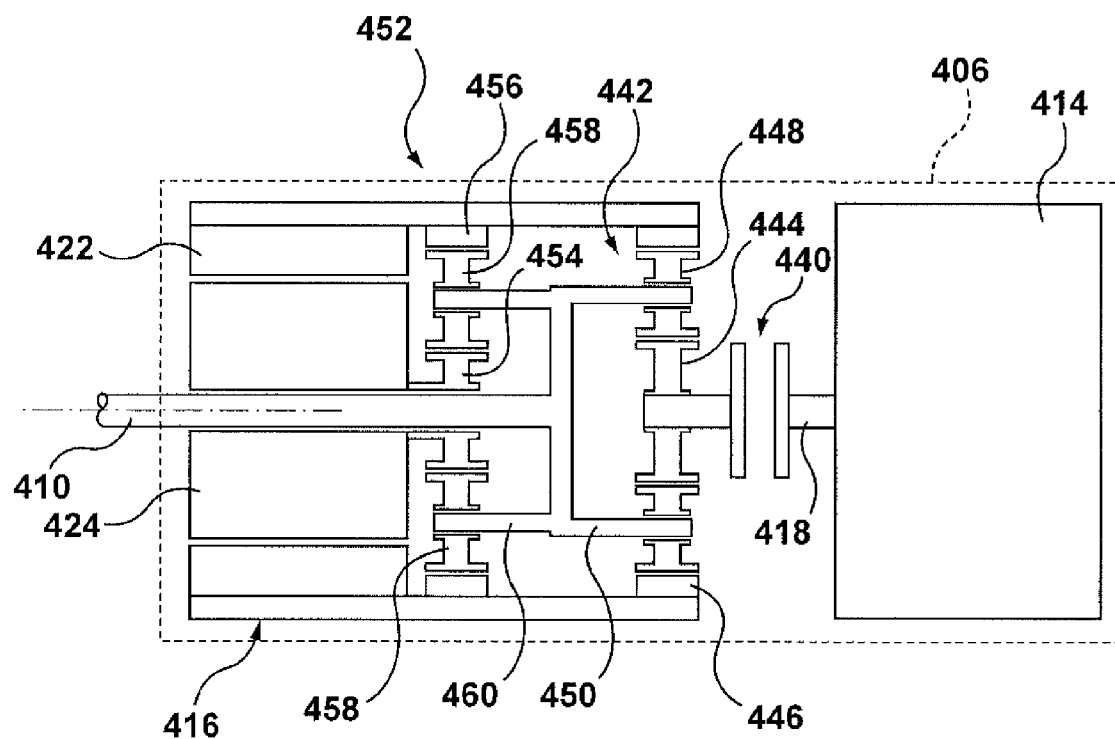
FIG. 6 is a schematic representation of another example of a hybrid powertrain.

Referring to FIG. 6, another embodiment of a powertrain 408 is illustrated schematically. The powertrain 408 is generally similar to powertrain 108, and like features are identified using like reference characters indexed by 300.

In this embodiment, the powertrain 408 includes a gear mechanism 442 coupled between the output shaft 418, via clutch 440, and the drive shaft 410 so that the output shaft 418 can rotate at a different speed, and optionally with a different torque than the drive shaft 410. The gear mechanism 442 may be any suitable mechanism, and in the illustrated embodiment is a planetary gear system 442.

The planetary gear system 442 has a sun gear 444 driven by the output shaft 418, a non-rotatable outer ring gear 446 (which may be fixed to the electric motor 416, the optional housing 406 or any other suitable member) and at least two planet gears 448 rotatably mounted on a planet carrier 450 and disposed radially between the sun gear 344 and the outer ring gear 446. In the illustrated example, the planet carrier 450 is non-rotatably coupled to the drive shaft 410, and may optionally be integrally formed with the drive shaft 410.

Optionally, an additional gear mechanism may be provided so that the rotor of the electric motor may be rotatable relative to the drive shaft, so that the drive shaft and the rotor may rotate at different speeds from each other, and optionally at different speeds than the output shaft. This may help facilitate greater flexibility in operating speeds and torques between the propeller, the internal combustion engine and the electric motor.

In the illustrated embodiment, the powertrain 408 includes a second gear system 452 connecting the drive shaft 410 to the rotor 424. In this configuration, the rotor 424 can rotate relative the drive shaft 410, but is still drivingly connectable to the output shaft 418 (via clutch 440) such that the rotor 424 may still function as the flywheel for the internal combustion engine 414.

The second gear mechanism 452 includes a second planetary gear system having a second sun gear 454 coupled to the rotor 424, a non-rotatable second outer ring gear 456 and at least two second planet gears 458 rotatably mounted on a second planet carrier 460 and disposed between the second sun gear 454 and the second outer ring gear 456. The second planet carrier 460 is non-rotatably coupled to the drive shaft 410 and, in the example illustrated, is non-rotatably connected to the planet carrier 450.

Optionally, instead of or as an addition to providing one or more gear mechanisms between the internal combustion engine and the electric motor, one or more gear mechanisms may be provided between the electric motor and the propeller or other driven member. In this configuration, the internal combustion engine and the electric motor may rotate at the same speed, and the propeller may rotate at a different speed than the electric motor.

Figure 7:
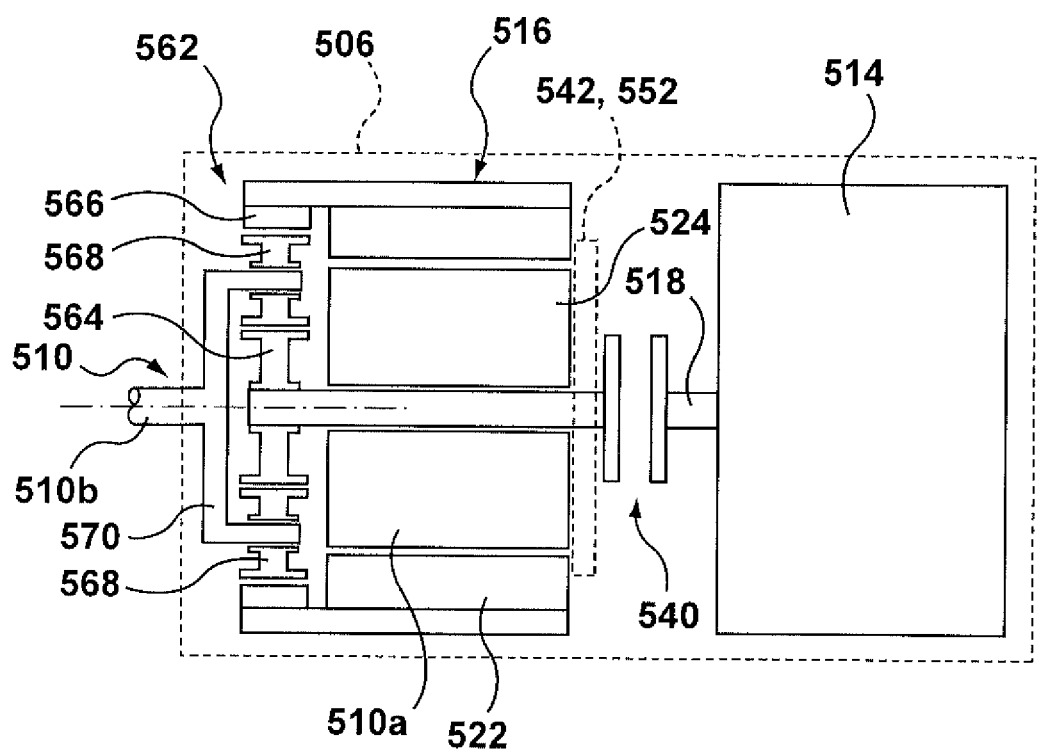
FIG. 7 is a schematic representation of another example of a hybrid powertrain.

Referring to FIG. 7, another embodiment of a powertrain 508 is illustrated schematically. The powertrain 508 is generally similar to powertrain 108, and like features are identified using like reference characters indexed by 400.

In this embodiment, the powertrain 508 includes a gear mechanism 562 coupled between the electric motor 516 and the propeller, via clutch 540, so that the propeller can rotate at a different speed, and optionally with a different torque than the rotor 524. The gear mechanism 562 may be any suitable mechanism, and in the illustrated embodiment is a planetary gear system 562. In this configuration, the drive shaft 510 includes a first portion 510a extending through the electric motor 516, and a second portion 510b coupled to the propeller 102. The first portion 510a and second portion 510b may rotate relative to each other.

The planetary gear system 562 has a sun gear 564 driven by the output shaft 518, a non-rotatable outer ring gear 566 (which may be fixed to the electric motor 516, the optional housing 506 or any other suitable member) and at least two planet gears 568 rotatably mounted on a planet carrier 570 and disposed radially between the sun gear 564 and the outer ring gear 566. In the illustrated example, the planet carrier 570 is non-rotatably coupled to the drive shaft 510, and may optionally be integrally formed with the drive shaft 510.

The gear ratio(s) between the sun gear 564, outer ring gear 566 and the planet gears 568 may be selected based on the speed-torque properties of the internal combustion engine 514 and the electric motor 516 and the desired operating speed of the propeller or other driven member.

The gear mechanism 562 may be used alone, or in combination with one or more other gear mechanisms, including, for example gear mechanisms 342, 442 and 452, as illustrated using an optional gear module (shown in dashed lines) that may include analogous gear mechanisms 542 and/or 552.

In the illustrated embodiments, the powertrain 108, 208, 308, 408 and/or 508 may be selectably operable in a first configuration in which both the internal combustion engine and the electric motor cooperate to drive the drive shaft, a second configuration in which only the internal combustion engine drives the drive shaft and a third configuration in which only the electric motor drives the drive shaft.

When the powertrain 108 (or any other embodiment of a powertrain described herein) is in use, it may be operated in one or more of the three configurations described above. For example, one example of a method of operating a hybrid powertrain in an aircraft, such as aircraft 100, may include the steps of:

a) driving the propeller 102 with both an internal combustion engine 114 and an electric motor 116 during an aircraft takeoff phase; and b) transitioning from the takeoff phase to an aircraft cruising phase and driving the propeller 102 with only one of the internal combustion engine 114 and the electric motor 116 during at least a portion of the cruising phase.

Operating the aircraft in this manner may enable the powertrain 108 to provide a relatively high takeoff power during the takeoff phase, and then provide a relatively lower cruising power during the cruising phase. This may help improve efficiency of the aircraft and/or may reduce fuel consumption.

Optionally, step b) can include driving the propeller 102 using only the internal combustion engine 114 during the at least a portion of the cruising phase. In this configuration the internal combustion engine 114 may continue to drive the rotor 124 of the electric motor 116 so that the rotor 124 continues to act as the flywheel for the internal combustion engine 114.

Alternatively, step b) may include driving the propeller 102 using only the electric motor 216 during the at least a portion of the cruising phase. This may also include decoupling the internal combustion engine 214 from the electric motor 216 during the cruising phase (for example using a clutch mechanism) so that the internal combustion engine 214 is not driven by the electric motor 216.

Optionally, the method may also include reducing the amount of heat and/or noise generated by the powertrain 108 by driving the propeller 102 using only the electric motor 116 during the cruising phase.

For example, a method of reducing detectability of an aircraft having a hybrid powertrain, may include the steps of:

a) driving a propeller with both an internal combustion engine and an electric motor during a first flight phase in which the powertrain generates at least a first thermal output and a first noise output; and b) shutting off the internal combustion engine and driving the propeller with only the electric motor during a second flight phase in which the powertrain generates at least a second thermal output and a second noise output and wherein the second thermal output is less than the first thermal output and the second noise output is less than the first noise output.

What has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A hybrid powertrain for an aircraft, the powertrain comprising:
    a) a drive shaft, the drive shaft rotatable about a drive axis;
    b) an internal combustion engine detachably connected to the drive shaft to selectably drive the drive shaft;
    c) a propeller coupled to the drive shaft;
    d) an electric motor having a stator and a rotor positioned axially between the internal combustion engine and the propeller and operable to selectably drive the drive shaft, the drive shaft extending through the electric motor, the rotor coupled to the drive shaft to rotate with the drive shaft;
    the powertrain is operable in a first mode and a second mode:
        in the first mode the internal combustion engine and the electric motor are both connected to the drive shaft and drive the propeller, the rotor rotates with the drive shaft and is a flywheel for the internal combustion engine; and
        in the second mode the internal combustion engine is detached from both the drive shaft and the electric motor, the rotor rotates with the drive shaft and only the electric motor drives the propeller without having to overcome the braking force of the internal combustion engine.

2. The powertrain of claim 1, wherein the internal combustion engine comprises an output shaft that is detachably coupled to the drive shaft and comprising a clutch provided between the output shaft and the drive shaft, wherein when the clutch is engaged the output shaft is coupled to the drive shaft and when the clutch is disengaged the output shaft is decoupled from the drive shaft and the drive shaft can rotate relative to the output shaft.

3. The powertrain of claim 2, wherein the output shaft is fixedly coupled to the drive shaft.

4. The powertrain of claim 2, wherein the output shaft is coaxial with and rotates about the drive shaft.

5. The powertrain of claim 2, further comprising a first gear mechanism coupled between the output shaft and the drive shaft so that the output shaft rotates at a first speed and the drive shaft rotates at a second speed that is different than the first speed.

6. The powertrain of claim 5, wherein the first gear mechanism comprises a first planetary gear system having a first sun gear driven by the output shaft, a non-rotatable first outer ring gear and at least two first planet gears rotatably mounted on a first planet carrier and disposed radially between the first sun gear and the first outer ring gear, the first planet carrier non-rotatably coupled to the drive shaft.

7. The powertrain of claim 1, wherein the rotor is rotatable relative to the drive shaft and is coupled to the drive shaft via a second gear mechanism, so that the drive shaft rotates at the second speed and the rotor rotates at a third speed that is different than the second speed.

8. The powertrain of claim 7, wherein the second gear mechanism comprises a second planetary gear system having a second sun gear coupled to the rotor, a non-rotatable second outer ring gear and at least two second planet gears rotatably mounted on a second planet carrier and disposed between the second sun gear and the second outer ring gear, the second planet carrier non-rotatably coupled to the drive shaft.

9. The powertrain of claim 1, further comprising a third gear mechanism connecting the propeller to the drive shaft, so that the drive shaft rotates at the second speed and the propeller rotates at a fourth speed that is different than the second speed.

10. The powertrain of claim 9, wherein the third gear mechanism comprises a third planetary gear system having a third sun gear driven by the drive shaft, a non-rotatable third outer ring gear and at least two third planet gears rotatably mounted on a third planet carrier and disposed between the third sun gear and the third outer ring gear, the third planet carrier non-rotatably coupled to the propeller.

11. The powertrain of claim 1 wherein the rotor is fixedly and non-rotatably connected to the drive shaft and rotates in unison with the drive shaft in both the first and second operating modes.

12. The powertrain of claim 1, wherein the internal combustion engine and the electric motor are adjacent to each other and are disposed within a single powertrain housing.

13. The powertrain of claim 1, wherein the stator has a stator length in a first direction and a space between the internal combustion engine and the electric motor in the first direction is between about 40% and about 65% of the stator length.

14. The powertrain of claim 1, wherein the electric motor is a starter motor for the internal combustion engine.

15. The powertrain of claim 1, wherein the rotor is the only flywheel in the powertrain.

16. The powertrain of claim 1, wherein in the first mode the powertrain produces a takeoff power output and in the second mode the powertrain produces a lower, cruising power output, and wherein a maximum power output of the internal combustion engine and a maximum power output of the electric motor are each less than the takeoff power output.

17. The powertrain of claim 16, wherein the maximum power output of the electric motor is less than the takeoff power output and is greater than or equal to the cruising power output.

18. The powertrain of claim 16, wherein the takeoff power output is about 80 kW and the cruising power output is about 50 kW.

19. The powertrain of claim 18, wherein the maximum power output of the electric motor is equal to or greater than maximum power output of the internal combustion engine.

20. The powertrain of claim 1, wherein the electric motor is configurable in an energized state in which it drives the drive shaft and a non-energized state in which it does not drive the drive shaft, and wherein the rotor rotates with the drive shaft and relative to the stator when the electric motor is in either the energized state or the non-energized state.

21. The powertrain of claim 1, wherein the powertrain is selectably operable in a third mode in which the electric motor is de-energized and does not exert a driving force on the drive shaft, the rotor remains connected to and rotates with the drive shaft, and only the internal combustion engine drives the drive shaft.

22. The powertrain of claim 1, further comprising a least one sensor to monitor at least one operating condition of the aircraft and a controller to change between the first and second modes based on signals received from the at least one sensor.

23. The powertrain of claim 22, comprising a flap position sensor for monitoring the position of a flap on the aircraft and wherein the controller changes the powertrain into the first mode when the flap position sensor senses the flap is in a takeoff position, and the controller changes the powertrain into the second mode when the flap position sensor senses the flap is in a cruising position.

24. The powertrain of claim 22, wherein the at least one sensor comprises at least one of a flap position sensor, an altitude sensor, an airspeed sensor, and a throttle position sensor.

25. The powertrain of claim 1, wherein the drive shaft extends directly from the rotor to the propeller whereby the electric motor is directly connected to the propeller in the absence of an intervening transmission member.

26. The powertrain of claim 12, further comprising a battery for supplying power to the electric motor and wherein the battery is disposed within the powertrain housing.

27. The powertrain of claim 1, wherein the internal combustion engine is a piston engine.

\* \* \* \* \*